June 30, 1931.  J. W. PETERSON  1,812,018
BRAKE ADJUSTING FIXTURE
Filed Aug. 1, 1928  2 Sheets-Sheet 2

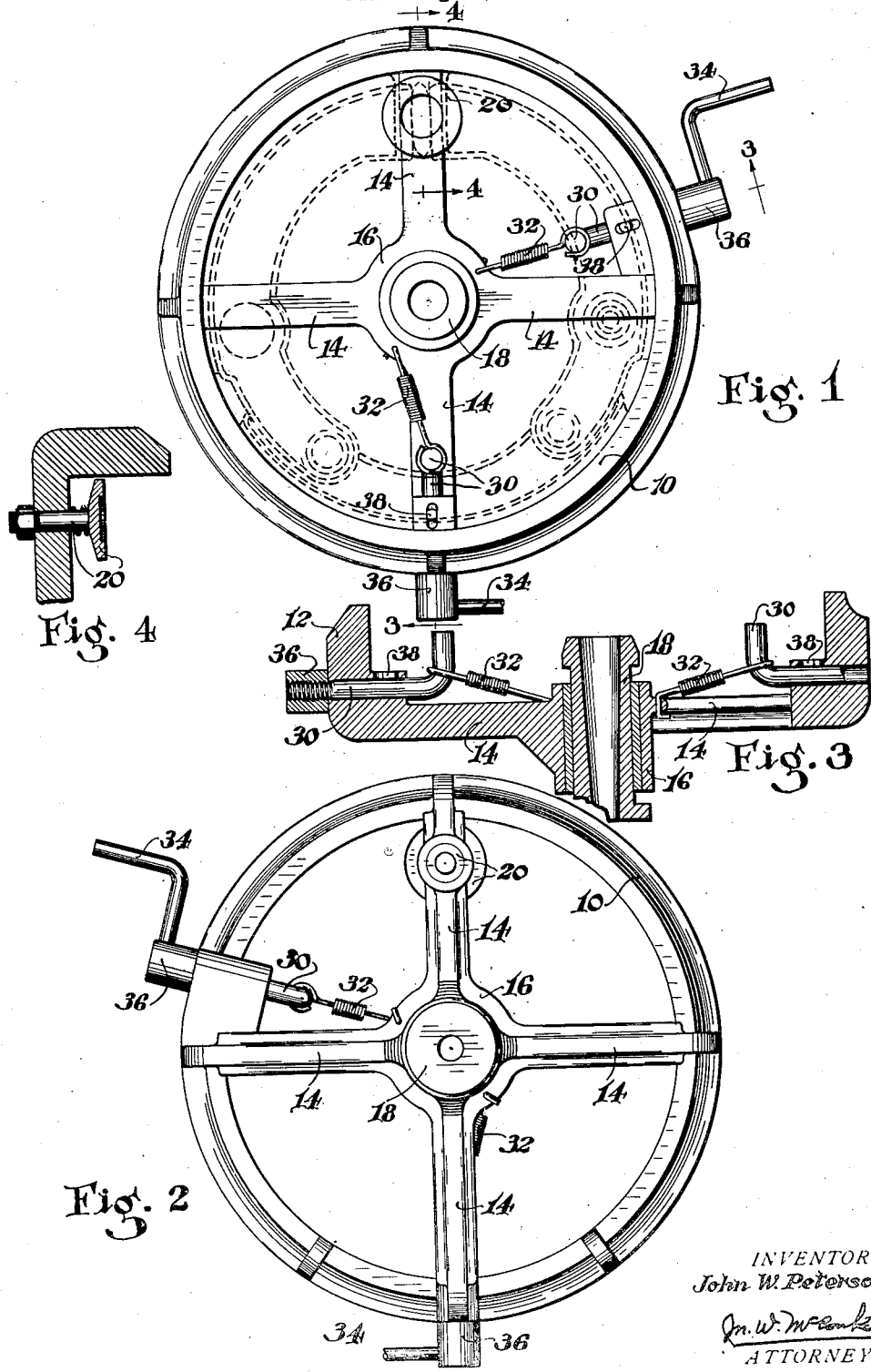

INVENTOR
John W. Peterson
ATTORNEY

Patented June 30, 1931

1,812,018

UNITED STATES PATENT OFFICE

JOHN W. PETERSON, OF SOUTH BEND, INDIANA, ASSIGNOR TO BENDIX BRAKE COMPANY, OF SOUTH BEND, INDIANA, A CORPORATION OF ILLINOIS

BRAKE-ADJUSTING FIXTURE

Application filed August 1, 1928. Serial No. 296,807.

This invention relates to the adjustment of brakes, and is illustrated as embodied in a novel fixture for holding the shoes of a brake accurately in their applied positions while their anchors are being tightened to fix them permanently in place. This permits setting the brake anchors very accurately after the brakes have been secured in place on the axles of an automobile.

The illustrated fixture includes a part arranged to be mounted on a wheel spindle and formed with a gage surface simulating the braking surface of a brake drum, and which carries clamps or equivalent devices for holding the brake shoes firmly against the gage surface while the anchors are being tightened.

The above and other objects and features of the invention, including various novel and desirable details of construction, will be apparent from the following description of the illustrative embodiments shown in the accompanying drawings, in which:

Figure 1 is a front elevation of the fixture, looking from the side next the brake;

Figure 2 is a rear elevation;

Figure 3 is a section through the fixture, on the line 3—3 of Figure 1;

Figure 4 is a partial section through the fixture on the line 4—4 of Figure 1.

Figure 5:
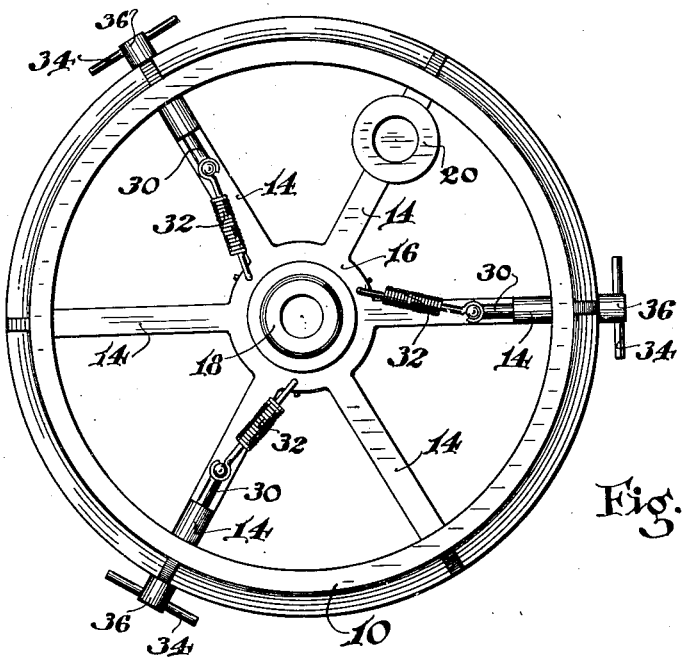
Figures 5 and 6 are respectively front and rear elevations of a modified form of fixture.

The illustrated fixtures are intended for use in adjusting the brake anchors (i. e. the brake shoe pivots), for example in a brake of the type described in Patent No. 1,567,716, granted Bendix Brake Company on December 29, 1925, on an application filed by A. Y. Dodge. This patent shows one form of a well-known commercial three-shoe automobile brake. In adjusting a brake of this type, after it has been bolted to the axle or front wheel knuckle, I prefer to leave the anchors or shoe pivots loose, and then to clamp the shoes firmly in the best position for them when the brake is applied. While the shoes are so held, the anchors or pivots are tightened and locked permanently in place.

The present invention relates to a novel fixture for holding the brake shoes thus clamped in applied position while the anchors are tightened or locked.

It comprises generally a main part 10, with an inner cylindrical gage surface accurately simulating the braking surface of a brake drum, and with spokes or the like 14 connecting it to a hub 16 arranged to receive any one of a series of interchangeable bushings 18 adapted to fit on various wheel spindles, axle shafts, etc.

The device is mounted on the wheel spindle (in the case of a front wheel brake), with the part 10 encircling the brake shoes. The angular position of the fixture may conveniently be determined by a locating device 20 engaging the brake cam. At this time the anchors or pivots of the auxiliary and secondary shoes of the brake are left loose in the backing plate, the backing plate having oversize openings for the anchors to permit them to be shifted slightly in any direction.

The auxiliary and secondary shoes are now forced firmly against the gage surface of the fixture by devices such as hooks or clamps 30 which are drawn up, against the resistance of tensioned springs 32, by turning handles 34 to draw up on nuts 36. Clamps 30 may be provided with keys 38 to prevent them from turning.

While the shoes are thus held in applied position, accurately determined by the gage surface of part 10, the anchors are tightened or locked to prevent shifting thereafter. The clamps may then be released, whereupon the fixture may be turned about its axis to make sure that the brake is not dragging, and to adjust the stop for the secondary shoe.

Figure 6:
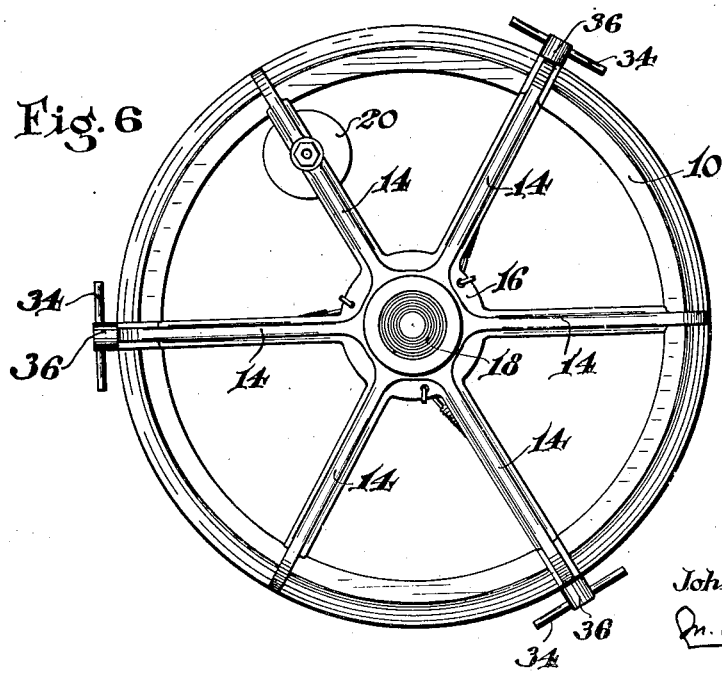

The arrangement of Figures 5 and 6 differs from that just described in that there are six spokes 14 instead of four, and there are three clamping devices 30 instead of two so that the fixture may be used for either a right brake or a left brake, only two of the three clamping devices being used in either case and the third one being idle.

While two illustrative embodiments have been described in detail, it is not my intention to limit the scope of the invention to that particular embodiment, or otherwise than by the terms of the appended claims.

I claim:

1. A fixture for adjusting brakes comprising, in combination, a part having a surface simulating the braking surface of a brake drum and arranged to be centrally mounted on a wheel spindle, and devices carried thereby for forcing the shoes of a brake firmly against said surface while the anchors of said shoes are being tightened.

2. A fixture for adjusting brakes comprising, in combination, a part having a cylindrical surface simulating the braking surface of a brake drum, and devices carried thereby for forcing the shoes of a brake firmly against said surface while the anchors of said shoes are being tightened.

3. A fixture for adjusting brakes comprising, in combination, a part having a cylindrical surface simulating the braking surface of a brake drum, a locating device arranged to engage the brake cam, and devices carried thereby for forcing the shoes of a brake firmly against said surface while the anchors of said shoes are being tightened.

In testimony whereof, I have hereunto signed my name.

JOHN W. PETERSON.